United States Patent
Leslie et al.

(10) Patent No.: US 12,286,219 B2
(45) Date of Patent: Apr. 29, 2025

(54) REACTION JET HELICOPTER

(71) Applicant: Genesis Aerotech Limited, Fintona (GB)

(72) Inventors: Martin Leslie, Fintona (GB); Patrick Mallon, Fintona (GB); Michael Rice, Fintona (GB)

(73) Assignee: Genesis Aerotech Limited, Fintona (GB)

( * ) Notice: Subject to any disclaimer, the term of this patent is extended or adjusted under 35 U.S.C. 154(b) by 0 days.

(21) Appl. No.: 17/633,376

(22) PCT Filed: Aug. 6, 2020

(86) PCT No.: PCT/EP2020/072210
§ 371 (c)(1),
(2) Date: Feb. 7, 2022

(87) PCT Pub. No.: WO2021/023847
PCT Pub. Date: Feb. 11, 2021

(65) Prior Publication Data
US 2022/0363373 A1    Nov. 17, 2022

(30) Foreign Application Priority Data
Aug. 6, 2019 (GB) .................. 1911224

(51) Int. Cl.
*B64C 27/18* (2006.01)
*B64D 41/00* (2006.01)
(52) U.S. Cl.
CPC .............. *B64C 27/18* (2013.01); *B64D 41/00* (2013.01)

(58) Field of Classification Search
CPC .................. B64C 27/18; B64C 29/04
See application file for complete search history.

(56) References Cited

U.S. PATENT DOCUMENTS

| | | | |
|---|---|---|---|
| 2,041,796 A | 5/1936 | Stalker | |
| 5,149,014 A * | 9/1992 | Faller | B64C 27/18 244/17.11 |
| 7,275,711 B1 * | 10/2007 | Flanigan | B64C 27/26 244/17.11 |

(Continued)

FOREIGN PATENT DOCUMENTS

| | | | |
|---|---|---|---|
| DE | 2414370 A1 | 10/1975 | |
| FR | 2891026 A1 * | 3/2007 | F03D 3/02 |

OTHER PUBLICATIONS

International Search Report and Written Opinion for corresponding PCT/EP2020/072210 dated Nov. 19, 2020 (17 pp).

*Primary Examiner* — Brady W Frazier
*Assistant Examiner* — Shanna Danielle Glover
(74) *Attorney, Agent, or Firm* — Renner, Kenner; Arthur M. Reginelli (57) ABSTRACT

A reaction-jet helicopter having an air compressor and a power source operable to power the compressor. The air compressor is in fluid communication with a cavity in a rotor blade of the reaction-jet helicopter. The rotor blade has one or more openings for the expulsion of compressed air from the cavity thereby resulting in rotation of the rotor blade. The reaction jet helicopter further has an arrangement for manipulating airflow between the compressor and the one or more openings. This results in reduced losses of energy as the airflow travels from the compressor to the one or more openings.

17 Claims, 3 Drawing Sheets

(56) References Cited

U.S. PATENT DOCUMENTS

2004/0197187 A1* 10/2004 Usab, Jr. ............... F04D 29/544
  415/1
2013/0161444 A1   6/2013 Spanos et al.
2016/0272311 A1   9/2016 White

* cited by examiner

REACTION JET HELICOPTER

The present invention relates to a helicopter. In particular, the present invention relates to a reaction-jet helicopter.

The rotor blades of reaction jet or "tip jet" helicopters are powered by forcing air through nozzles at the blade tips, resulting in reactive forces powering rotation of the blades and providing lift and propulsion. Powering rotation of the rotor blades at their tips as opposed to from a central shaft overcomes issues with the torque of the central shaft causing rotation of the fuselage in an opposite direction to the rotation of the rotor. Accordingly, reaction-jet helicopters do not require an antitorque rotor (tail rotor). A considerable amount of helicopter accidents results from malfunctioning tail rotors and so obviating their requirement provides improved safety over shaft-driven helicopters. Reaction jet helicopters are also substantially less complex than central shaft helicopters as none of the machinery to operate a tail rotor is required. This reduces manufacturing cost and complexity, overall cost, and the amount of skill and training required to operate. Reaction-jet helicopters utilise compressed air forced out of the rotor blade nozzles to power rotation. Typically, these helicopters have an engine which powers a compressor to force air through a duct to a distribution hub where it is then distributed into and along cavities within the rotor blades and exiting the nozzles at the rotor blade tips.

Reaction-jet helicopters are known, yet production and usage of reaction-jet helicopters remains much lower than that of central shaft helicopters. The power required to operate the compressor often surpasses that required to power a central shaft helicopter having similar speed and range capacities. Despite reaction-jet helicopters being safer, the low efficiency relative to central shaft helicopters has resulted in a low uptake of the technology.

One problem with reaction-jet helicopters is that the air from the compressor—which is typically of high velocity and elevated temperature—is slowed and cooled by contact with component parts of the reaction-jet helicopter, such as the duct and the hub, as it moves from the compressor to the nozzles. The efficiency of the reaction-jet helicopter could be improved if the pathway of airflow from the compressor to the nozzles was made less resistive to the movement of air. In particular, there is a right-angled turn where the duct meets the rotor blades and where the airflow direction is consequently sharply converted from linear movement in one direction into a direction that is perpendicular to and rotational to said linear movement. This results in a considerable slowing of the airflow speed. Further efficiency improvements could be made if the energy that is usually lost in movement of the air from the compressor to the nozzles could be harvested and converted into useable energy.

It is an object of the invention to obviate or mitigate the problems with reaction jet helicopters outlined above.

It is a further object of the invention to improve the efficiency of reaction jet helicopters.

According to a first aspect of the invention there is provided a reaction-jet helicopter comprising an air compressor and a power source operable to power the compressor, the air compressor being in fluid communication with a cavity in a rotor blade, the rotor blade comprising one or more openings for the expulsion of compressed air from the cavity thereby resulting in rotation of the rotor blade, the reaction jet helicopter further comprising a means for manipulating airflow between the compressor and the one or more openings.

Ideally, the rotor blade being a rotor blade of the reaction-jet helicopter.

Ideally, the reaction-jet helicopter comprising two or more rotor blades.

Preferably, each rotor blade comprises a cavity.

Ideally, each rotor blade comprises one or more openings for the expulsion of air from the cavities thereby resulting in rotation of the rotor blades.

Preferably, the rotor blade comprising one or more nozzles for the expulsion of compressed air from the cavity thereby resulting in rotation of the rotor blade.

Ideally, the nozzle being disposed at or about the opening.

Ideally, each rotor blade comprising one or more nozzles for the expulsion of compressed air from the cavities thereby resulting in rotation of the rotor blades.

Preferably, the rotor blade, or each rotor blade, comprising one or more nozzles for the expulsion of compressed air from the cavity or cavities.

Ideally, the reaction-jet helicopter comprises a means for manipulating airflow between the compressor and the one or more nozzles.

Preferably, the means for manipulating airflow can manipulate airflow between the compressor and the one or more openings and/or one or more nozzles.

Preferably, the reaction-jet helicopter comprises a duct in fluid communication with the air compressor and in further fluid communication with the cavity of the rotor blade.

Preferably, the reaction-jet helicopter comprises a duct in fluid communication with the air compressor and in further fluid communication with the cavities of the two or more rotor blades.

Ideally, the reaction-jet helicopter comprises a hub in fluid communication with the duct and with the cavity of the rotor blade.

Ideally, the reaction-jet helicopter comprises a hub in fluid communication with the duct and with the cavities of the two or more rotor blades.

Ideally, the hub is disposed relative to the duct and the rotor-blade cavity or cavities such that airflow travels from the duct to the hub and then into the blade cavity or cavities.

Ideally, the one or more openings and/or nozzles are located at or about the tips of the one or more rotor blades.

Preferably, the one or more openings and/or nozzles are arranged for tangential expulsions of compressed air from the cavity or cavities of the rotor blade or blades. By 'tangential expulsion' we mean that the compressed air is expelled from the cavity in an initial direction that is tangential to the circle formed and defined by the rotation of the blades.

Ideally, the power source is an engine.

Ideally, the means for manipulating airflow is operable to manipulate the direction and/or speed of the airflow as it travels from the compressor to the one or more openings or nozzles.

Ideally, the means for manipulating airflow is operable to convert a substantially linear airflow into a substantially rotating airflow whereby the airflow rotates about a central longitudinal axis.

Ideally, the central longitudinal axis being the axis of the duct.

In one embodiment, the means for manipulating airflow comprises a duct component for manipulating the direction and/or speed of airflow within the duct.

Ideally, the duct component imparts a rotation to the airflow within the duct.

In prior art reaction-jet helicopters that utilise compressed air to power rotation of the rotor blades, traditionally the airflow in the duct is substantially linear before it meets the hub and is forced into the rotor blade cavities. The airflow loses considerable energy during the translation from linear movement in one direction in the duct to a direction perpendicular and rotational to said linear movement at the hub. Advantageously, the duct component imparts a rotation to the airflow in the duct before it reaches the hub, so it is more easily distributed tangentially into the rotor blade cavities when it meets the hub. The means for manipulating airflow thereby reduces the amount of energy lost in the airflow when it meets the hub, as it is travelling at an annular and angular direction relative to the hub and not perpendicularly to the hub. The means for manipulating airflow reduces the requirement for the airflow to make energy-consuming right-angled turns as it travels from the compressor to the nozzles.

Preferably, the duct component is located within the duct.

Ideally, at least part of the means for manipulating airflow, most preferably the duct component, is fixed within the duct.

Preferably, the duct component has an angled surface relative to the sides of the duct and/or the initial input airflow direction.

Advantageously, where the initial airflow direction is parallel to the sides of the duct, as the airflow contacts the angled surface it is forced along the surface an angle relative to the side of the duct thereby imparting a rotation to the airflow.

Ideally, the duct component comprises a helical blade.

Alternatively, the duct component may be any arrangement operable to impart a swirling motion to the airflow within the duct.

In one embodiment, the means for manipulating airflow comprises at least two duct components located within the duct.

In one embodiment, the means for manipulating airflow comprises a hub swirl component shaped to direct the airflow from the compressor towards the rotor blade cavity, or towards at least one of the rotor blade cavities.

Ideally, the hub swirl component is a sloped hub swirl component.

Ideally, the hub swirl component has curved vane structures normal to the initial airflow direction.

Preferably, the vane structures curve outwards in a direction that is normal to the initial airflow direction.

Ideally, the hub swirl component is arranged in the hub such that the slope can receive and direct airflow along the slope of the hub swirl component towards the rotor blade cavity, or towards at least one of the rotor blade cavities, as the airflow moves towards the rotor blade cavity, or towards at least one of the rotor blade cavities.

Traditionally, reaction-jet helicopters have a T-shaped junction between the duct and the rotor blade cavities, resulting in the airflow making a right-angled turn with frictional and fluid momentum loss while doing so. By inserting a sloped portion at the point where the airflow meets the T-shaped junction, the airflow retains momentum as it moves from the duct into the rotor blade cavities. Additionally, by directing the air out of the duct this reduces pressure build-up within the duct and increases flow through.

Ideally, the slope of the hub swirl component is arrangeable to extend from at or about an upper portion of the inlet of the rotor blade cavity or cavities towards the outlet of the duct.

Preferably, the slope is a curve.

In one embodiment, the hub swirl component is fixed relative to the hub and rotor blade or blades.

In one embodiment, the hub swirl component is integrally formed with the hub.

In another embodiment, the hub swirl component is rotatably fixed relative to the hub and rotor blade or blades.

In yet another embodiment, the hub swirl component is releasably fixable relative to the hub and rotor blades such that it can be either fixed relative to the hub or released to move relative to the hub.

In one embodiment, the hub swirl component is an impeller, being shaped such that it is rotated by airflow from the duct. Most preferably, the hub swirl component is a bifurcating impeller.

Advantageously, when the hub swirl component is fixed to the hub, the impeller action encourages rotation of the rotor blades, further improving efficiency.

Ideally, the reaction-jet helicopter comprises a dynamo, the hub swirl component being operably engageable with the dynamo.

Advantageously, rotation of the hub swirl component generates electricity via the dynamo. When excess mass flow is generated the hub swirl component may be released from the rotation of the rotor blades and the hub swirl component can then rotate at speeds in excess of that of the rotation of the rotor blades generating increased amounts of electricity via the dynamo. The dynamo-produced electricity can then be used to at least partially power component parts of the reaction-jet helicopter.

Ideally, the reaction-jet helicopter comprises a battery in electrical communication with the dynamo, the battery being operable to store electricity generated by the dynamo.

Preferably, the dynamo and/or the battery is in electrical communication with the compressor and can provide electricity thereto to power air compression.

Advantageously, as the compressor is partially powered from the dynamo-produced electricity, this reduces the net energy consumption of the engine.

Ideally, the reaction-jet helicopter comprises control means for fixing and releasing the hub swirl component to the hub.

Preferably, the control means has adjustable pressure parameters for determining when to release and when to fix the hub swirl component to the hub.

Ideally, the control means can be actuated by pressure force which disengages the hub swirl component from the hub when a preset pressure in the hub is reached.

Additionally or alternatively, the control means may comprise a pressure transducer to control a locking pin to lock the hub swirl component relative to the hub.

Additionally or alternatively, the control means may comprise a mechanical means for disengaging the hub swirl component when a preset rotor speed is reached.

Ideally, the mechanical means for disengaging the hub swirl component comprises a clutch.

Preferably, the opening and/or nozzle is located on a distal end of the rotor blade.

Ideally, the opening and/or nozzle is located on a trailing edge of the rotor blade.

Preferably, at least one rotor blade includes an input aperture to receive a flow of air.

Ideally, the input aperture is in fluid communication with the hub.

Preferably, the cavity or each cavity comprises one or more fluid channels.

Ideally, the compressor is a turbine-driven air compressor.

Ideally, a flow of air is produced when compressed gas is exhausted from the compressor.

Ideally, the duct is a pipe or tube having, most preferably having a generally circular cross section, although other cross-sections may be suitable and within the scope of the invention.

Preferably, compressed gas is exhausted from the compressor into the duct.

Preferably, the hub has one or more dispensing aperture(s).

Ideally, the dispensing aperture(s) of the hub is in fluid communication with the rotor blade or each rotor blade.

Preferably, the hub is rigidly attached to the rotor blade or each rotor blade.

Preferably, the hub is rotatably mounted relative to the duct.

According to a second aspect of the invention there is provided a means for manipulating airflow between a compressor and rotor-blade openings and/or nozzles of a reaction-jet helicopter, the means for manipulating airflow being adapted to be fitted to a duct and/or hub of a reaction-jet helicopter and being operable to manipulate airflow between the compressor and the openings and/or nozzles of the reaction-jet helicopter in use.

Ideally, the means for manipulating airflow comprising a duct component and/or a hub swirl component.

According to a third aspect of the invention there is provided a duct component for manipulating the direction and/or speed of airflow within the duct of a reaction-jet helicopter.

Ideally, the duct component imparts a rotation to the airflow within the duct when fitted.

Preferably, the duct component is locatable within a duct.

Preferably, the duct component is arrangeable within a duct such that the duct component has an angled surface relative to the sides of the duct and/or the initial input airflow direction into the duct.

Ideally, the duct component comprises a helical blade.

Alternatively, the duct component may be any arrangement operable to impart a swirling motion to the airflow within the duct.

According to a fourth aspect of the invention there is provided a hub swirl component for a reaction-jet helicopter, the reaction-jet helicopter comprising a compressor, a hub and a rotor blade, the rotor blade comprising a cavity and an opening and/or nozzle, the hub swirl component being operable to direct airflow from the compressor towards the rotor blade cavity.

Ideally, the hub swirl component is a sloped hub swirl component.

Ideally, the hub swirl component has curved vane structures that are arrangeable to be normal to the initial airflow direction.

Ideally, the hub swirl component is arrangeable in the hub such that the slope can receive and direct airflow along the slope of the hub swirl component towards the rotor blade cavity, or towards at least one of the rotor blade cavities, as the airflow moves towards the rotor blade cavity, or towards at least one of the rotor blade cavities.

Ideally, the slope of the hub swirl component is arrangeable to extend from at or about an upper portion of the inlet of the rotor blade cavity or cavities towards the outlet of the duct.

Preferably, the slope is a curve.

In one embodiment, the hub swirl component is fixable relative to a hub of a reaction-jet helicopter.

In another embodiment, the hub swirl component is rotatably fixable relative to a hub of a reaction-jet helicopter.

In yet another embodiment, the hub swirl component is arrangeable to be releasably fixable relative to a hub and rotor blades of a reaction-jet helicopter such that it can be either fixed relative to the hub or released to move relative to the hub.

In one embodiment, the hub swirl component is an impeller, being shaped such that it is rotated by airflow from the duct.

Ideally, the hub swirl component is connectable electrically to a dynamo, battery and/or a compressor.

Ideally, the hub swirl component is can be arranged to communicate with a control means of a reaction-jet helicopter, the control means being operable to fix and release the hub swirl component to the hub.

It will be appreciated that optional features applicable to one aspect of the invention can be used in any combination, and in any number. Moreover, they can also be used with any of the other aspects of the invention in any combination and in any number. This includes, but is not limited to, the dependent claims from any claim being used as dependent claims for any other claim in the claims of this application.

The invention will now be described with reference to the accompanying drawings which shows by way of example only a main embodiment of an apparatus in accordance with the invention.

Figure 1:
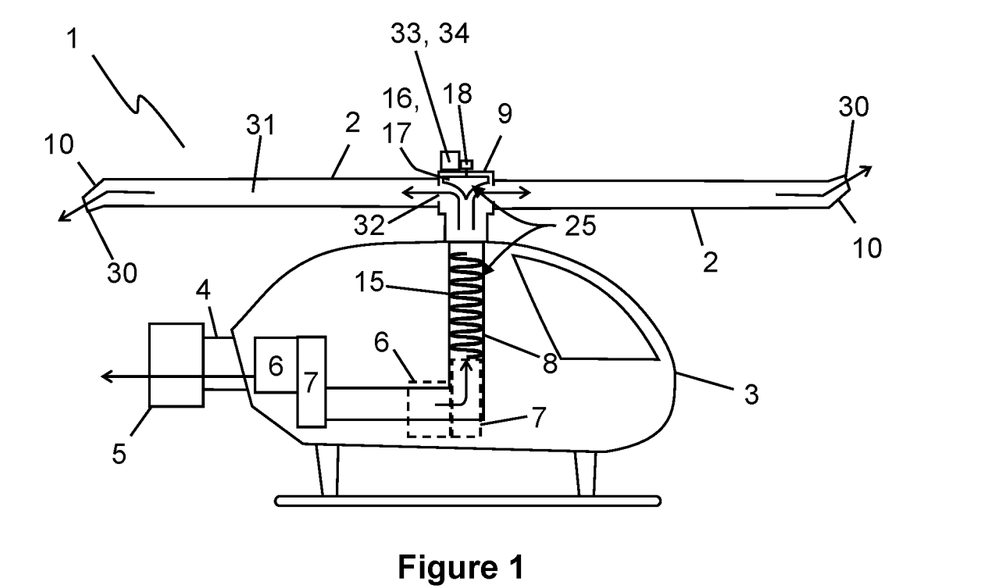
FIG. 1 is a schematic side view of a reaction-jet helicopter according to the invention.

In FIG. 1 there is shown a reaction-jet helicopter according to an embodiment of the invention indicated generally by reference numeral 1. The reaction-jet helicopter 1 has a fuselage 3, engine 6, tail boom 4 and rudder 5. The propulsion assembly of the reaction-jet helicopter 1 has a compressor 7, duct 8, hub 9, rotor blades 2 and openings 10. In the embodiment shown, the engine 6 and compressor 7 are located towards the rear of the fuselage 3. However, in an alternative embodiment, it would be possible to situate the engine 6 and compressor 7 vertically below the duct 8, such that the compressed air travels in a linear airflow path from the compressor 7 to the hub 9. In FIG. 1, an engine 6 and compressor 7 are illustrated in dotted lines below the duct 8 to show the location of the engine 6 and compressor 7 in the alternative embodiment. The reaction-jet helicopter further has nozzles 30 disposed at the openings 10. Compressor 7 is used to convert atmospheric-pressure air, input via a compressor inlet pipe (not shown), into compressed gas. When compressed gas from compressor 7 is exhausted into a lower-pressure atmosphere, the pressure differential produces a flow of gas. In the preferred embodiment compressor 7 is a turbine-driven air compressor and is powered by a primary power source in the form of engine 6. In use, the engine 6 drives the compressor 7 to produce compressed air which is then exhausted into duct 8. The duct 8 is a pipe having a circular cross section, although other cross-sections are within the scope of the invention such as tapered, eccentric or elliptical cross sections, or any suitable cross-section, and which is in fluid communication with both the output of compressor 7 and a receiving aperture in hub 9. A flow of gas travels through the duct 8 and into hub 9 via the receiving aperture. The hub 9 comprises one or more dispensing apertures through which gas may flow into the cavities of the rotor blades 2. Compressed gas travels into the cavities within rotor blades 2 via input apertures, and is ejected through openings 10 located on each rotor blade 2. The dispensing apertures in the hub 9 and the input apertures of the cavities 31 within the rotor blades are aligned or at least partially or completely aligned with one another. Each opening 10 comprises an aperture surrounded by a sheath and is located at a distal end of a rotor blade 2. As will be appreciated by the person of skill in the art, air flow is created in the duct 8, hub 9 and cavities 31 within rotor blades 2 due to the difference in pressure between the gas within the propulsion system, and atmospheric pressure outside of the aircraft.

Figure 2:
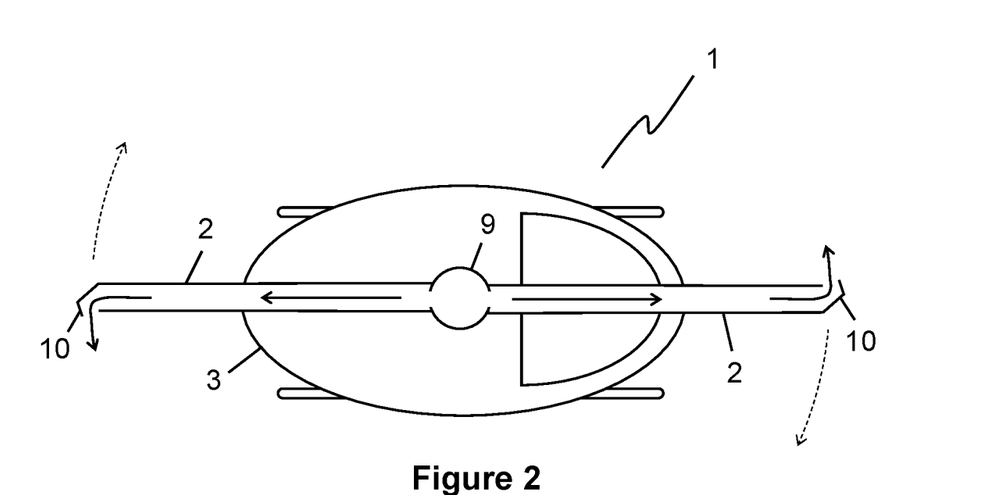
FIG. 2 is a schematic top view of a reaction-jet helicopter according to the invention.

FIG. 2 is a top view of the aircraft 1 showing the direction of gas flow through the cavities 31 inside the rotor blades 2, and out through openings 10 located at the tips thereof. The release of compressed gas from the tip of each rotor blade 2 provides a force which pushes the blades in a direction opposite to that of the direction of the expelled gas stream. Since the rotor blades 2 are rotatably mounted with respect to the fuselage 3, each rotor blade traces a circular path about an axis. The dashed lines in FIG. 2 show the rotational direction of the rotors 2 during operation of the aircraft 1. Each rotor blade 2 has an airfoil cross section which, when pitched and rotated about the hub produces lift, and when the rotor disc is maneuvered will produce side, forward and aft propulsive force. In use, i.e. during flight while the rotor blades 2 rotate, the openings 10 are located on a trailing edge of the rotor blades 2. During operation, the exhaust from engine 6 is directed over rudder 5 to provide directional control of aircraft 1.

Figure 4:
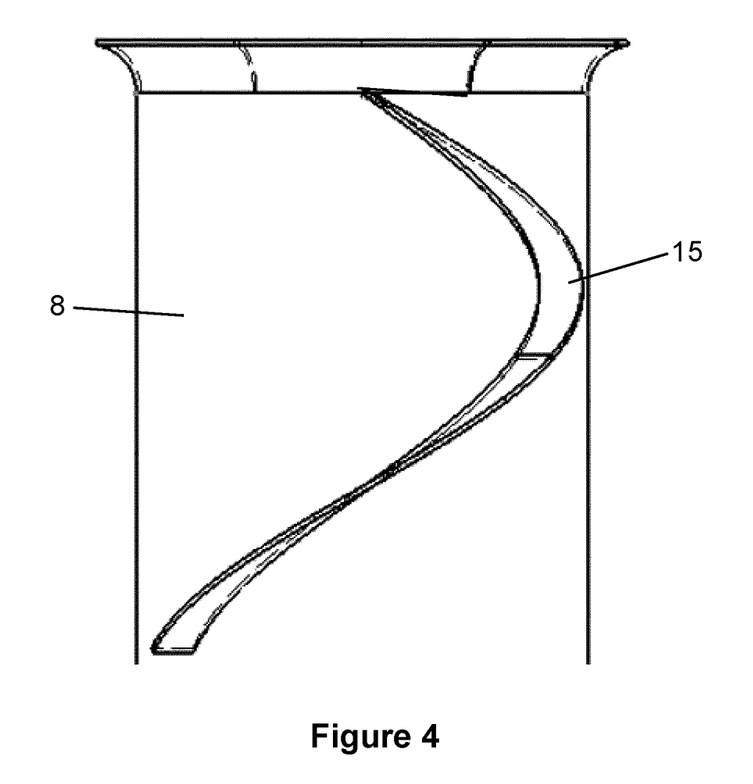
FIG. 4 is a cross-sectional side view of a duct and a duct component according to the invention located within the duct.

The reaction-jet helicopter 1 has an assembly 25 for manipulating airflow between the compressor 7 and the openings 10. In particular, the assembly 25 involves a duct component 15 fixed within the duct 8. The assembly 25 further involves a sloped hub swirl component 16 located within the hub 9. The duct component 15 has an angled surface relative to the sides of the duct 8 and the initial input airflow direction. The duct component 15, as shown in FIG. 4, is a helical blade that is located in the airflow pathway between the compressor 7 and the hub 9. The helical blade of the duct component 15 has a plurality of turns. The surface of the duct component 15 is arranged to meet the airflow as it enters the duct 8 and to impart a rotation to the airflow within the duct 8, which has a substantially linear flow as it is exhausted from the compressor 7 into the duct 8. As the airflow strikes the duct component 15 it is forced along the surface of the helix into a swirl pattern. The airflow is then rotating when it meets the hub 9. The airflow is therefore more easily diverted into the blade cavities 31, minimizing energy loss.

Figure 3:
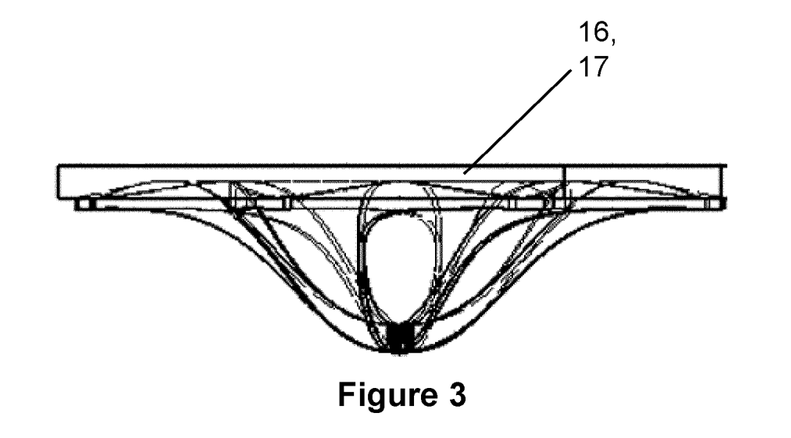
FIG. 3 is a cross-sectional side view of a hub swirl component according to the invention.
Figure 5:
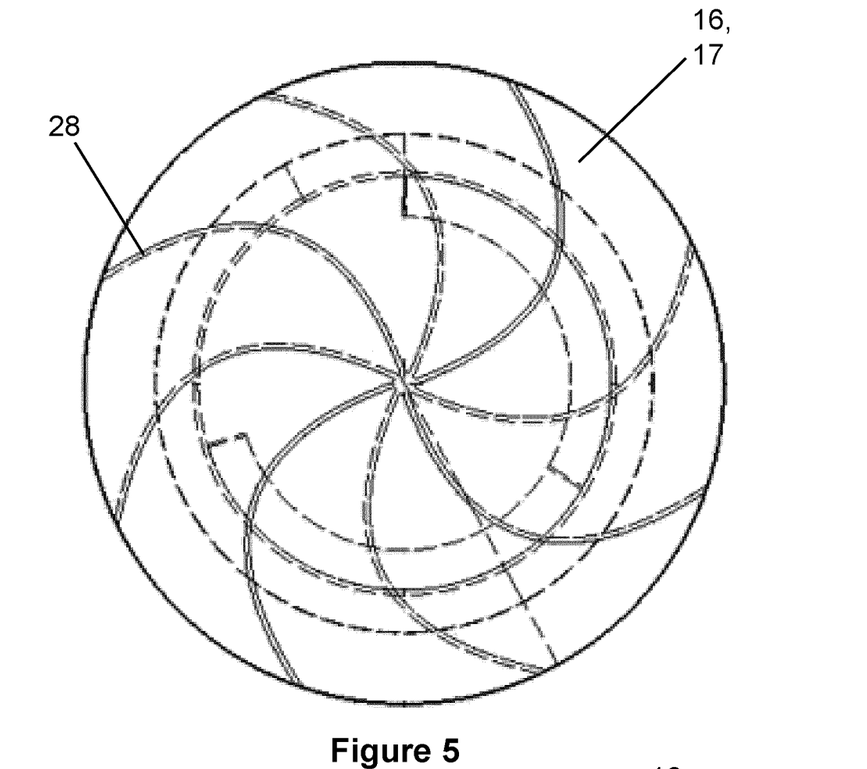
FIG. 5 is an top-side view of a hub swirl component according to the invention.
Figure 6:
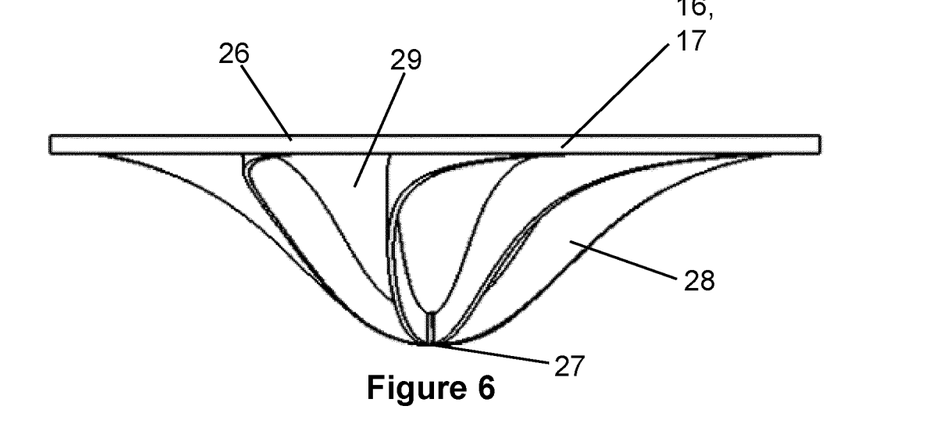
FIG. 6 is a side view of a hub swirl component according to the invention.

The hub swirl component 16, as shown in FIGS. 3, 5 and 6, has an impeller 17 which is releasably fixed within the hub 9. In other embodiments, it is possible to have the hub swirl component 16 fixed within the hub 9 such that it moves relative to the hub 9, or rotatably fixed relative to the hub 9, such that it rotates independently of the hub 9. The impeller 17 is dome shaped and, in this embodiment, the steepness of the slope of the dome increases from the base 26 of the dome the to tip 27, providing a curving slope. The hub swirl component 16 comprises a plurality of blades 28. The blades 28 define the dome shape of the hub swirl component 16. In this embodiment, the blades 28 are identical in shape, but in other embodiments the shapes may vary. In this embodiment, the hub swirl component 16 comprises eight blades 28. Each blade 28 extends from the periphery of the base 26 of the hub swirl component 16, to the tip 27. In the centre of the dome of the hub swirl component 26 is a dome-shaped supporting structure 29 that supports the blades 28. The blades 28 extend initially radially outwardly from the tip 29 and then sweep backwards and downwards around the dome shaped supporting structure 29 to the periphery of the base 26. In the embodiment shown the blades 28 are equi-spaced angularly around the dome shaped supporting structure 29 although this is not essential.

The tip 27 of the dome is coaxial with the duct 8, protruding into the airflow pathway such that the airflow is urged along the slope of the dome and along the blades 28 towards the receiving apertures 32 of the cavities 31 of the rotor blades 2. The base 26 of the dome of the hub swirl component 16 is arranged to be aligned with the inlet aperture 32 of the blade cavities 31. This further mitigates airflow energy loss, reduces pressure build-up within the duct 8 and increases flow through. When the hub swirl component 16 is fixed relative to the hub 9 and therefore the rotor blades 2, the action of the airflow on the hub swirl component 16 encourages rotation of the blades 2, further improving efficiency.

The hub swirl component 16 is further linked to a dynamo 18 which generates electricity as the hub swirl component 16 rotates. When excess mass flow is generated the hub swirl component 17 may be released from the rotation of the rotor blades 2. The hub swirl component 17 can then rotate at speeds in excess of that of the rotation of the blades 2, generating electricity via engagement with the dynamo 18. The dynamo-produced electricity can then be used to at least partially power component parts of the reaction-jet helicopter 1. The reaction-jet helicopter 1 further has a control means 33 that is preset to determine when to engage/disengage the hub swirl component 17 relative to the blades 2. Various types of control means could be used to engage/disengage the hub swirl component 17 from the hub 9. For example, the control means could be actuated by pressure force which disengages the hub swirl component 17 from the hub 9 when a preset pressure in the hub is reached. Alternatively, the control means 33 may have a pressure transducer to control a locking pin to lock the hub swirl component 17 relative to the hub 9. Alternatively again, the control means may comprise a mechanical means for disengaging the hub swirl component 17 when a preset rotor speed is reached. In some embodiments, combinations of these control means may be present in the reaction-jet helicopter. The hub swirl component 17 thereby serves three functions: the curved slope reduces energy loss in the airflow from the duct 8 to the blades 2; the impellor shape is rotated by the airflow urging rotation of the blades 2, and; engagement with the dynamo 18 generates useable electricity that can further power the compressor 7 and the helical blade 20.

In use, the reaction-jet helicopter 1 is operated by a user powering up the engine 6. The engine 6 powers the compressor 7 which compresses atmospheric air and exhausts the air into the duct 8. The air rapidly expands and moves linearly along the duct 8 where it contacts the duct component 15. The duct component 15 imparts a rotation to the airflow before it enters the hub 9. In the hub 9, the airflow drives the hub swirl component 16 and is urged by the curved slopes of the hub swirl component 16 into the cavities 31 of the rotor blades 2. The airflow continues along the rotor blades 2 and exits at the openings 10 located at the tips of the blades 2. The reactive forces of the expulsion of the air from the openings 10 causes the blades 2 to rotate, providing lift and propulsion. Where excess mass flow is experienced in the duct 8, the hub swirl component 16 is disengaged from the rotor blades 2. The airflow causes the hub swirl component 16 to rotate faster than the speed of the rotor blades 2 thereby driving the dynamo 18 with increased force and generating increased amounts of electricity. The electricity is stored in a battery 34 and is useable to power the compressor 7, thereby reducing the energy consumption of the engine 6. When the flow rate has reduced the hub swirl component 16 engages with the blades 2 and rotates relative to the blades 2.

Various modifications will be apparent to this skilled in the art. For example, a helical blade is not necessarily required to impart a swirl effect on the airflow within the duct. Any geometrical form that provides imparts a rotation to the airflow is within the scope of the invention. Alternatively, non-physical means are possible such as auxiliary air jets located along the duct 8 in position to impart a swirl are possible. It would also be possible to movably and releasably fix the duct component 15 within the duct 8, and even power rotation of the duct component 15 to accelerate movement of air through the duct 8. The reaction-jet helicopter 1 could also have a motor for powering rotation of the duct component 15 within the duct 2 when the blade 15 is not fixed relative to the duct 2.

In the preceding discussion of the invention, unless stated to the contrary, the disclosure of alternative values for the upper or lower limit of the permitted range of a parameter, coupled with an indication that one of the values is more highly preferred than the other, is to be construed as an implied statement that each intermediate value of the parameter, lying between the more preferred and the less preferred of the alternatives, is itself preferred to the less preferred value and also to each value lying between the less preferred value and the intermediate value.

The features disclosed in the foregoing description or the following drawings, expressed in their specific forms or in terms of a means for performing a disclosed function, or a method or a process of attaining the disclosed result, as appropriate, may separately, or in any combination of such features be utilised for realising the invention in diverse forms thereof as defined in the appended claims.

The invention claimed is:

1. A reaction-jet helicopter comprising:
   (i) an air compressor;
   (ii) a power source operable to power the air compressor;
   (iii) a plurality of rotor blades, wherein each rotor blade of the plurality of rotor blades includes a cavity, and wherein the air compressor is in fluid communication with each cavity of each rotor blade, and wherein each rotor blade of the plurality of rotor blades includes an opening for the expulsion of compressed air from each cavity of each rotor blade thereby resulting in rotation of each rotor blade of the plurality of rotor blades;
   (iv) a duct in fluid communication with the air compressor and in further fluid communication with each cavity of each rotor blade;
   (v) a hub in fluid communication with the duct and with each cavity of each rotor blade, the hub being disposed relative to the duct and each cavity of each rotor blade such that airflow travels from the duct to the hub and then into each cavity of each rotor blade; and
   (vi) a means for manipulating airflow between the compressor and the opening of each rotor blade, wherein the means for manipulating airflow comprises a hub swirl component, said hub swirl component being located within the hub, wherein the hub swirl component is integrally formed with the hub, and wherein the hub swirl component is shaped to direct the airflow from the compressor towards each cavity of each rotor blade, and wherein the hub swirl component is an impeller, and wherein the means for manipulating airflow comprises a duct component for manipulating the direction and speed of airflow within the duct, said duct component being locatable within the duct.

2. The reaction-jet helicopter as claimed in claim 1 wherein the means for manipulating airflow is operable to manipulate the direction and speed of the airflow as it travels from the compressor to the opening of each rotor blade.

3. The reaction-jet helicopter as claimed in claim 2 wherein the means for manipulating airflow is operable to convert a substantially linear airflow into a substantially rotating airflow whereby the airflow rotates about a central longitudinal axis, the central longitudinal axis being the axis of the duct.

4. The reaction-jet helicopter as claimed in claim 1 wherein the duct component is configured to impart a rotation to the airflow within the duct before it reaches the hub.

5. The reaction-jet helicopter as claimed in claim 4 wherein the duct component is fixed within the duct.

6. The reaction-jet helicopter as claimed in claim 4, wherein the duct component has an angled surface relative to the sides of the duct.

7. The reaction-jet helicopter as claimed in claim 6 wherein the duct component is operable to impart a swirling motion to the airflow within the duct.

8. The reaction-jet helicopter as claimed in claim 1 wherein the hub swirl component is a sloped hub swirl component and wherein the hub swirl component is arranged in the hub such that the slope can receive and direct airflow along the slope of the hub swirl component towards each cavity of each rotor blade as the airflow moves towards each cavity of each rotor blade.

9. The reaction-jet helicopter as claimed in claim 1 wherein the hub swirl component is fixed relative to the hub and the plurality of rotor blades or is rotatably fixed relative to the hub and the plurality of rotor blades.

10. The reaction-jet helicopter as claimed in claim 1 wherein the hub swirl component is releasably fixable relative to the hub and the plurality of rotor blades such that it can be either fixed relative to the hub or released to move relative to the hub.

11. The reaction-jet helicopter as claimed in claim 10, wherein the reaction-jet helicopter comprises a control means for fixing and releasing the hub swirl component to the hub.

12. The reaction-jet helicopter as claimed in claim 11 wherein the control means has adjustable pressure parameters for determining when to release and when to fix the hub swirl component to the hub.

13. The reaction-jet helicopter as claimed in claim 11 wherein the control means comprises a mechanical means for disengaging the hub swirl component when a preset rotor speed is reached.

14. The reaction-jet helicopter as claimed in claim 1 wherein the reaction-jet helicopter comprises a dynamo, the hub swirl component being operably engageable with the dynamo.

15. The reaction-jet helicopter as claimed in claim 14 wherein the reaction-jet helicopter comprises a battery in electrical communication with the dynamo, the battery being operable to store electricity generated by the dynamo.

16. The reaction-jet helicopter as claimed in claim 5 wherein the dynamo and/or the battery is in electrical communication with the compressor and can provide electricity thereto to power air compression.

17. The reaction-jet helicopter as claimed in claim 1 wherein the opening of each rotor blade is arranged for tangential expulsions of compressed air from each cavity of each rotor blade.

\* \* \* \* \*